L. E. PURNELL.
REEL.
APPLICATION FILED MAY 27, 1918. RENEWED JUNE 3, 1919.
1,314,607. Patented Sept. 2, 1919.
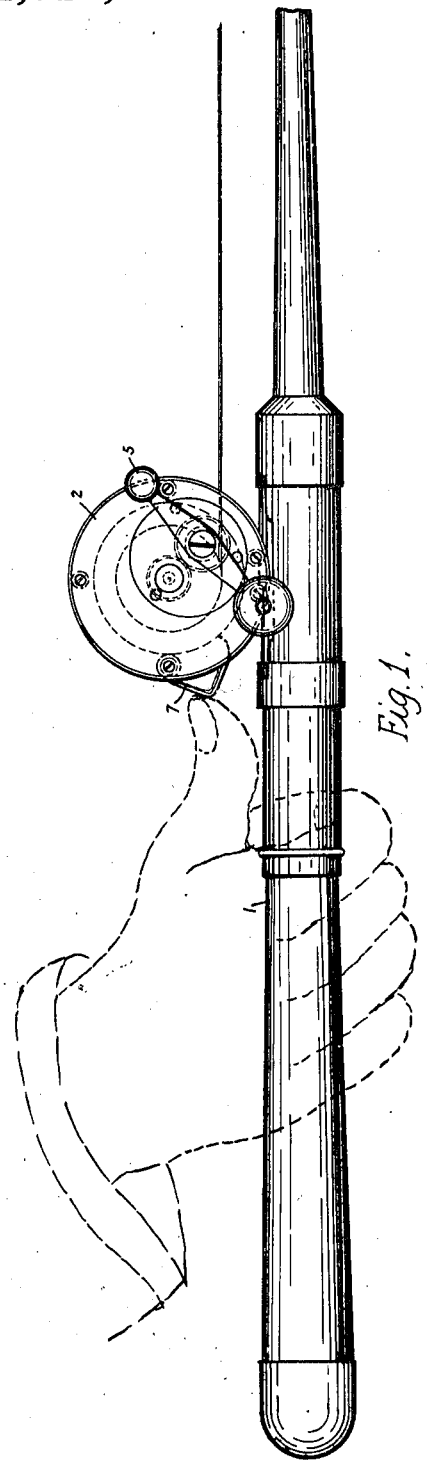
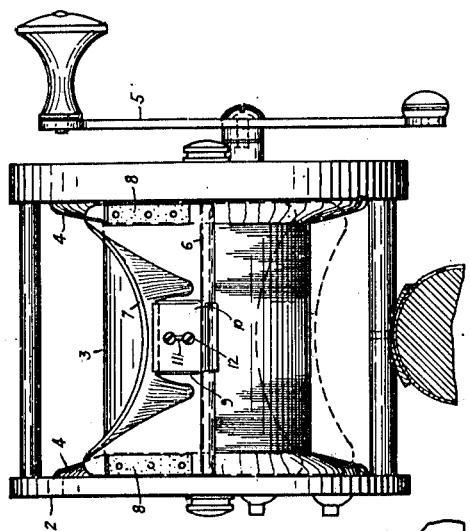
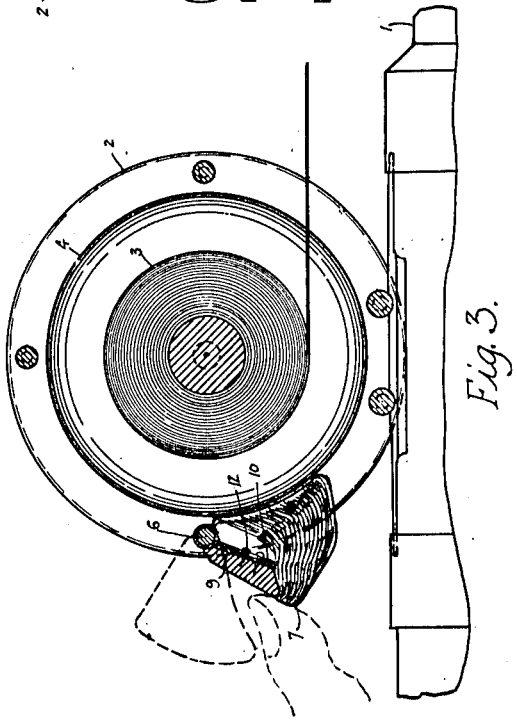
INVENTOR
Lew E. Purnell,
BY:
Hardway & Cathy,
ATTORNEYS.

UNITED STATES PATENT OFFICE.

LEW E. PURNELL, OF LAWTON, OKLAHOMA.

REEL.

1,314,607.     Specification of Letters Patent.     Patented Sept. 2, 1919.

Application filed May 27, 1918, Serial No. 236,859. Renewed June 3, 1919. Serial No. 301,565.

*To all whom it may concern:*

Be it known that I, LEW E. PURNELL, a citizen of the United States, residing at Lawton, in the county of Comanche and State of Oklahoma, have invented certain new and useful Improvements in Reels, of which the following is a specification.

This invention relates to new and useful improvements in a reel.

The object of the invention is to provide a reel for fishing poles, around which the line is wound, said reel being equipped with a brake which may be engaged with the spool to retard or stop the rotation thereof. In fishing with a pole equipped with a reel, the line is wound on the reel, and the free end to which the hook is attached passes through eyes carried by the pole. It is often desirable when a fish is on the hook, to give it line, and when the line has been sufficiently unwound, from the reel, it is then necessary to stop the rotation of the spool so as to prevent too much of the line from unwinding. The brake herein described has been provided for that purpose.

With the above and other objects in view, the invention has particular relation to certain novel features of construction, operation, and arrangement of parts, an example of which is given in this specification and illustrated in the accompanying drawings, wherein:

Figure 1, is a side view of a reel mounted on a fishing pole.

Fig. 2, is a rear view thereof, and

Fig. 3, is a transverse sectional view.

Referring now more particularly to the drawings wherein like numerals of reference designate similar parts in each of the figures, the numeral 1, refers to a fishing pole whereon a reel is mounted. This reel is composed of a frame 2, in which the spool 3 is rotatably mounted, said spool having the end flanges 4, 4. The spool is rotated in the well known manner by the crank 5. The parts hereinbefore described are of the usual and well known construction, and usually formed of metal.

The frame 2 has a transverse rod 6, hinged to which is the brake 7. This brake is arcuate in general contour and its ends are formed to receive the brake shoes 8, 8, in alinement with the end flanges 4, 4, of spool 3 and preferably formed of composition material. Permanently secured to the brake is a bearing plate 9, and hinged to the rod 6, is a corresponding plate 10, having the oblong slot 11, therethrough. These plates are fitted together and a screw 12 passes through said slot 11, and through an alined orifice in the plate 9, and is screwed into the brake 7, thus forming the hinge connection of the brake to the rod 6, and the slot 11 admitting of the adjustment of the said brake.

In fishing, one hand of the fisherman grasps the rod behind the reel, the thumb projecting under the brake.

When a fish is on the hook, and it is desired to let the line out, an upward pressure by the thumb against the brake releases said brake and permits the spool to turn. When the line has been sufficiently unwound, the brake may then be forced by the thumb against the end flanges, and the spool locked against rotation. The brake may thus be released or applied by the fisherman without his releasing his grip upon the pole.

The brake herein described is formed so that it will not contact against the line wound on the spool and wear and injure the same, but contacts only with the spool flanges, and cannot wear or injure the reel, as is the case with brake appliances now in common use.

What I claim is:

A fishing reel including a frame, a rotatable spool mounted therein and provided with end flanges formed of metal of oval contour, a transverse brake rod carried by the frame, a brake, an adjustable hinge connecting said rod and brake, detachable arcuate brake shoes carried by the ends of said brake and formed of composition material, said shoes conforming in shape to, and being adapted to rest against the inner sides of the spool flanges when the brake is set.

In testimony whereof I have signed my name to this specification in the presence of two subscribing witnesses.

LEW E. PURNELL.

Witnesses:
WM. A. CATHEY,
IRENE BRUNS.